United States Patent [19]

Takedoi et al.

[11] 4,251,592

[45] Feb. 17, 1981

[54] STABILIZATION TREATMENT OF ACICULAR FERROMAGNETIC IRON OR IRON-ALLOY PARTICLES AGAINST THE OXIDATION THEREOF

[75] Inventors: Atushi Takedoi; Nanao Horiishi; Goro Matsui; Koji Toda, all of Hiroshima, Japan

[73] Assignee: Toda Kogyo Corp., Hiroshima, Japan

[21] Appl. No.: 26,548

[22] Filed: Apr. 3, 1979

Related U.S. Application Data

[63] Continuation-in-part of Ser. No. 877,895, Feb. 15, 1978, abandoned.

[51] Int. Cl.[3] .................... B32B 5/16

[52] U.S. Cl. .................... 428/403; 427/127; 427/128; 428/469; 428/900

[58] Field of Search .................... 427/127, 132, 48; 428/900, 469, 403

[56] References Cited

U.S. PATENT DOCUMENTS

| | | | |
|---|---|---|---|
| 4,066,564 | 1/1978 | Sasazawa et al. | 427/127 |
| 4,125,474 | 11/1978 | Dezawa et al. | 427/127 |

*Primary Examiner*—Bernard D. Pianalto
*Attorney, Agent, or Firm*—Stevens, Davis, Miller & Mosher

[57] ABSTRACT

Stabilization treatment of acicular ferromagnetic iron or iron-alloy fine particles against the oxidation thereof comprises the steps of (a) suspending acicular ferromagnetic iron or iron-alloy particles obtained by the reduction of acicular iron oxide which may contain Co or Ni in an aqueous alkaline solution having 0.01 to 18-N of hydroxyl ion concentration at a temperature of 5° to 70° C. while stirring the suspension in a non-oxidative atmosphere therethrough and thereby controlling the dissolution of ferrous ion from the surface of the acicular particles therein, (b) oxidizing the surface of the acicular particles in the resultant suspension by introducing an oxygen containing gas therein at a temperature of 60° to 100° C. to form dense and thin magnetite film on the surface of the acicular particles; and (c) drying the resultant particles in air at a temperature below 100° C.

9 Claims, 7 Drawing Figures

(X 20000)

(X 20000)

(X20000)

(X20000)

STABILIZATION TREATMENT OF ACICULAR FERROMAGNETIC IRON OR IRON-ALLOY PARTICLES AGAINST THE OXIDATION THEREOF

This application is a continuation-in-part application of a pending application Ser. No. 877,895 filed Feb. 15, 1978 now abandoned.

BACKGROUND OF THE INVENTION

This invention relates to a process for stabilizing acicular ferromagnetic iron or iron-alloy particles, especially, having an averaged particle-size smaller than 1μ against the oxidation thereof as contacted with the air. More particularly, this invention relates to the production of novel acicular iron or iron-alloy fine particles having stable magnetic properties in the air at a temperature below 100° C.

In recent years, a demand for a high efficiency of magnetic recording media has more and more increased with the progress in miniaturizing and lightening a magnetic recording and reproducing apparatus. Namely, improvements in a high density recording and a high output characteristic, in particular, a high frequency characteristic have been demanded in the recording media. Magnetic material is therefore required to have a large saturated magnetic flux density and a high coercive force to satisfy the above demand.

Magnetic materials conventionally employed so far as magnetic recording media include magnetic powder such as magnetite, maghemite and chromium dioxide, which have saturated magnetic flux density, $\sigma_s$, between about 70–85 emu/g and coercive force, $H_c$, between 250–500 $O_e$.

Referring, in particular, to the oxide magnetic powder, it has saturated magnetic flux density at most about 85 emu/g and generally between about 70–80 emu/g, which forms a main factor to restrict the limits for the reproducing outputs and the density in recording. Further, while Co-containing magnetic powder, that is, Co-Magnetite or Co-maghemite magnetic powder has also been used and characterized by its coercive force as high as 400–800 $O_e$, the saturated magnetic flux density thereof is only as low as 60–80 emu/g.

Meanwhile, it is well known in the art that magnetic powder of acicular iron or iron-alloy particles which is substantially pure iron or an iron-alloy shows more excellent magnetic properties, that is, a greater saturated magnetic flux density, $\sigma_s$, (for example, between 90–200 emu/g) and a higher coercive force, $H_c$, (for example, between 600–2000 $O_e$) as compared with the foregoing conventional oxide type magnetic powder.

As far as the inventors are informed, however, those acicular iron or iron-alloy particles prepared by the reduction of acicular iron oxide have not yet been used on an industrial scale as magnetic recording material because of their significant unstability to oxidation.

Since these acicular iron or iron-alloy particles are extremely fine, being less than 1μ, and the activity on the particle surfaces is very high, a violent oxidation together with heat development results upon exposing them in the air.

Such a significant unstability of the acicular iron or iron-alloy particles, is pointed out, for example, as follows: Japanese patent application laying open No. 135835/1974 discloses that even a magnetic alloy powder which has become noted as a high density magnetic recording material in place of the conventional iron oxide magnetic powder still shows such an unstability as resulting in a violent oxidation to fire when taken out as it is in the air just after the production, because the powder is finely divided into a size as small as several μ. Japanese patent application laying open No. 97738/1974 also discloses that acicular iron or iron-alloy particles have not yet been put to practical use at present. One of the causes is a problem of oxidation-resistant property of the metallic magnetic powder in the air. The metallic magnetic powder, if left in the air, gradually loses its magnetic property with the progress of oxidation and, in the worst case, ignites spontaneously to burn in a moment due to external heating, mechanical shock, electrostatic discharging or the like. In the fine particles such as those used for the magnetic powder whose size is greatly decreased, the contaction area to the air generally increases due to the increase in the surface area per unit weight (specific surface area) and the reactivity thereof is no more negligible. Therefore, the metallic magnetic powder produced through reduction, if taken out from the furnace as it is and contacted to the air, spontaneously ignites to burn out because of the violent oxidation.

In view of the above, several processes for stabilizing acicular iron or iron-alloy particles against the oxidation have already been proposed in the prior art as summarized below.

Japanese patent application laying open Nos. 112465/1976, 97738/1974, 135835/1974, 12958/1972, 5057/1971 and the like disclose methods comprising treating native acicular iron or iron-alloy particles with organic solvents. In the above methods, the organic solvent coating the acicular particles is gradually evaporated in the air to result in a moderate contaction between the particles and the air thereby forming a thin oxide film on the surface of the particles.

Co-existence of the igniting acicular fine metallic particles and the combustible organic solvent is, of course, very dangerous and since it imposes a heavy burden on the production control cost, the methods are not suited to industrial practice. Moreover, the above methods give much troubles to the control of the evaporating state of the organic solvent and hence a difficulty in the control of the formation of metal oxide coating film.

Meanwhile, Japanese patent application laying open No. 79153/1973 discloses a method comprising the steps of moderatedly oxidizing the surface of the native acicular iron particles over a long time with a gaseous mixture consisting of 1% air and 99% $N_2$. Unfortunately, this method results in much trouble in the control of the oxidizing degree at the surface, requires a long time for the treatment and hence is not suited to the industrial practice.

SUMMARY OF THE INVENTION

Accordingly, an object of this invention is to provide an improved and effective stabilization method of acicular ferromagnetic iron or iron-alloy particles against the oxidation thereof as contacted with the air.

Another object of this invention is to provide novel acicular ferromagnetic iron or iron-alloy fine particles having dense and thin magnetic film on the surface thereof and useful as high quality magnetic material.

Other objects, features and attending advantages of the invention will become more apparent from the following detailed description with reference to the accompanying drawings. Briefly, the foregoing and other objects of this invention can be accomplished by the process of the invention which comprises the combination of the following steps of: suspending acicular ferromagnetic iron or iron-alloy particles as starting material obtained by the reduction of acicular iron oxide or the same containing Co and/or Ni and retained under non-oxidative condition in an aqueous alkaline solution having 0.01 to 18-N of hydroxyl ion concentration at a temperature of 5° to 70° C. to control the dissolution of ferrous iron from the acicular particles therein, oxidizing the surface of the acicular particles in the resultant suspension by introducing an oxygen containing gas therein at a temperature of 60° to 100° C. to form dense and thin magnetite film on the surface of the acicular particles and thereafter drying the resultant particles in air at a temperature below 100° C.

DETAILED DESCRIPTION OF THE INVENTION

Figure 1:
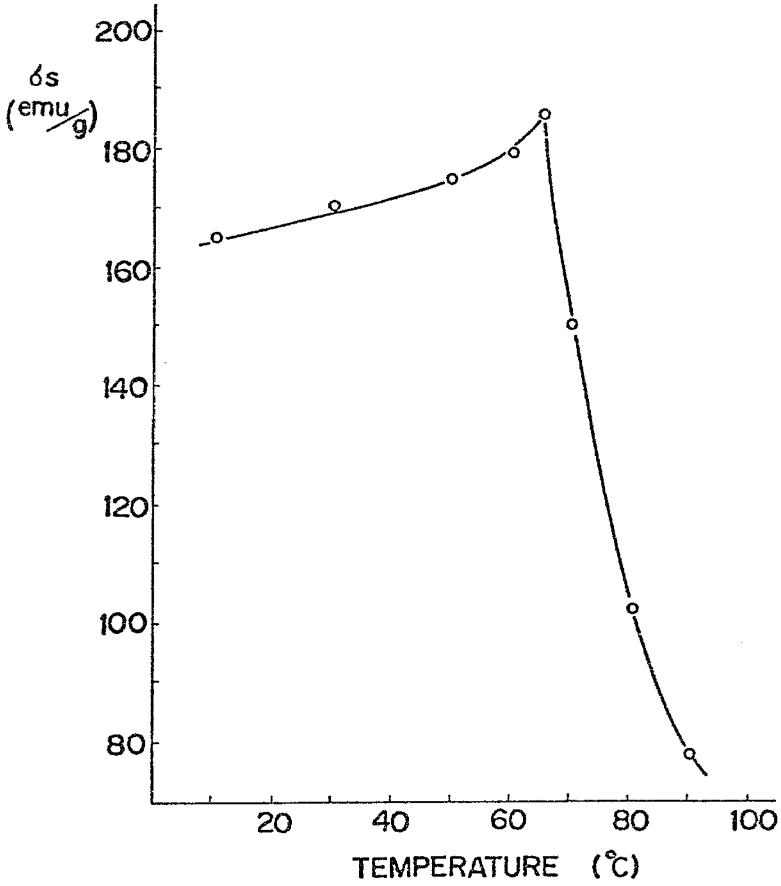
FIG. 1 is a chart for showing the relation between the temperature of the aqueous sodium hydroxide solution in the control stage for the dissolution amount of $Fe^{2+}$ and the saturated magnetic flux density of the resulting particles.

It has now been found that active acicular iron or iron-alloy fine particles immediately after their production from acicular iron oxide or the same containing Co and/or Ni through reduction can be effectively protected against oxidation with time upon exposure to the air by coating the surface thereof with a dense and well-bonding thin magnetite film.

Thus, a principal object of the invention is to find several critical reaction conditions for effectively forming the dense and thin magnetic film on the surface of the acicular iron or iron-alloy particles.

The inventors have considered that the phenomenon of the formation of metal oxide coating on the surface of the acicular iron or iron-alloy particles is similar to that of so-called metal corrosion and, therefore, that the composition of the metal oxide coating, as well as the formation mechanism and the coating effects thereof can be understood by grasping the corrosion mechanism.

Metal corrosion generally includes two types, that is, hydrogen-yielding corrosion and oxygen-consuming corrosion.

The hydrogen-yielding corrosion is a phenomenon found such as in "corrosion of Fe in sulphuric acid and an aqueous solution of sulfuric acid" as described, for example, in "METAL SURFACE TECHNOLOGY," on page 33 (published by Nikkan Kogyo Shinbunsha, 1969), and the oxygen-consuming corrosion is a phenomenon found such as in "corrosion of Fe in static water, an aqueous alkaline solution" as described, for example, in the above literature on its page 34.

Particularly, the mechanism for the oxygen-consuming corrosion can be summarized in an electrochemical point of view as follows:

An equilibration shown by relation (1) is established on the anode side and oxygen, if present in water, acts as a depolarizer to result in the reaction represented by relation (2) on the cathode side:

$$Fe + 2H^+ \rightleftharpoons Fe^{2+} + 2H \ldots \quad (1)$$

$$2H + \tfrac{1}{2}O_2 \rightarrow H_2O \ldots \quad (2)$$

Thus, when the depolarizing reaction represented by the relation (2) is taken place, corrosion reaction shown by relation (3) begins to proceed:

$$Fe + 2H^+ + \tfrac{1}{2}O_2 \rightarrow Fe^{2+} + H_2O \ldots \quad (3)$$

Although the above elemental reaction scheme can be utilized as described later for the understanding of the reaction mechanism in the process of the invention, it does not yet go so far as to provide critical reaction conditions for the formation of a dense and thin magnetite film of a composition comprising substantially pure magnetite ($Fe_3O_4$).

In view of the foregoing, the inventors have further made a keen study of the conditions for forming the magnetite coating film as a metal oxide film and, as the result, discovered the conditions described below.

Conditions for Controlling the Amount of $Fe^{2+}$ Dissolved

For forming a dense and well-bonding thin magnetite film on the surface of the acicular iron or iron-alloy fine particles, it is, among all, important to restrict the dissolved amount of $Fe^{2+}$ to the minimum level required.

(a) Conditions in the aqueous alkaline solution:

When the active acicular fine particles immediately after the production are suspended in an aqueous solution of sodium hydroxide, the foregoing oxygen-consuming reaction:

$$Fe + 2H^+ + \tfrac{1}{2}O_2 \rightarrow Fe^{2+} + H_2O$$

is taking place at the surface of the particles due to oxygen dissolved in the aqueous solution to dissolve out $Fe^{2+}$. As described above, the $Fe^{2+}$ dissolution according to the relation (3) is depending on the amount of oxygen dissolved in the aqueous solution, and the amount is decreased as the temperature of the aqueous solution rises and the $OH^-$ concentration goes higher.

In addition to the dependence shown by the relation (3), the $Fe^{2+}$ dissolution from the particles to be treated is also controlled by its solubility in the aqueous solution and the solubility increases with the rise in the temperature of the aqueous solution and the decrease in the $OH^-$ concentration.

The control of the dissolved amount of $Fe^{2+}$ required in this invention can be achieved by setting the temperature of the aqueous solution of sodium hydroxide at 5° to 70° C. and adjusting the $OH^-$ concentration to 0.01-18-N.

On the contrary, if the temperature for the aqueous solution of sodium hydroxide is below 5° C. and the $OH^-$ concentration is above 18−N, no sufficient formation of the magnetite film can be attained, probably because of a too small amount of dissolved $Fe^{2+}$. If the temperature of the aqueous sodium hydroxice solution is above 70° C. and the $OH^-$ concentration is below 0.01−N, granular particles of iron oxides other than acicular particles are formed. It is considered, that the above relation is attributable to the increase in the dissolved amount of the particles to be treated, which leads to more dissolution of $Fe^{2+}$ than required.

(b) Conditions in the reaction atmosphere:

In order to strictly restrict the amount of oxygen dissolved in the aqueous alkaline solution as stated in (a), it is very important to set the reaction atmosphere to be a non-oxidative atmosphere. Namely, it should be surely avoided that oxygen gas or oxygen containing gas from the outside is introduced and dissolved into the suspension through the process of stirring the suspension. Therefore, the suspension is stirred in, for example, inert gas atmosphere.

On the contrary, if unnecessary oxygen gas from the outside is introduced and dissolved the suspension through the process of stirring, a lot of undesired granular particles will be produced in the product.

Conditioned for Converting $Fe^{2+}$ into Magnetite

While dissolved $Fe^{2+}$ combines with $OH^-$ in the aqueous solution to form $Fe(OH)_2$, sufficient conversion of the $Fe(OH)_2$ into magnetite through oxidation can be achieved by adjusting the temperature of the aqueous sodium hydroxide solution to between 60° to 100° C. while keeping the $OH^-$ concentration of the solution from 0.01 to 18−N and passing an oxygen-containing gas through the solution.

The critical reaction conditions summarized as above for the process according to this invention are to be described in more detail referring to the accompanying drawings.

FIG. 1 is a chart for showing the relation between the temperature of the aqueous sodium hydroxide solution in the control stage for the dissolution of $Fe^{2+}$ and the saturated magnetic flux density of the resulted particles. More specifically, the chart shows the relation between the saturated magnetic flux density of the particles which are obtained by preparing acicular ferromagnetic iron particles from 300 g acicular α-FeOOH particles having 1.0μ long axis in average value and 20:1 long axis/short axis ratio through heat reduction at a reducing temperature of 360° C. in a $H_2$ gas stream at a rate of 3 l/min., suspending the acicular iron particles thus prepared in a 2 liter 1.0−N aqueous solution of sodium hydroxide at temperatures between 10°-90° C., thereafter, adjusting the temperature of the resultant suspension to 70° C. and then passing air therethrough at a rate of 1.0 l/min., and the temperature of the aqueous sodium hydroxide solution in the control stage for the dissolution amount of $Fe^{2+}$. As can be seen from FIG. 1, while the particles obtained consist only of acicular particles and show a very high saturated magnetic flux density if the temperature for the aqueous sodium hydroxide solution is between 10°-70° C. in the control stage for the dissolution amount of $Fe^{2+}$, inclusion of granular particles of iron oxide other than the acicular particles becomes increased and the saturated magnetic flux density tends to decrease in proportion to the increase in the temperature as the temperature rises above 70° C. The above relation is attributable, it is considered, to that while the acicular iron particles having a thin magnetite film can be obtained at a temperature between 10°-70° C., granular particles of iron oxides other than the acicular particles produced at a temperature above 70° C. to increase the solubility of the particles to be treated thereby dissolving out $Fe^{2+}$ in a great quantity. Thus the $Fe^{2+}$ component not involved with the formation of the magnetite film forms granular particles by itself.

Figure 2:
FIG. 2 and FIG. 3 show electron microscopic photographs (×20000) for the particles obtained at room temperatures of the aqueous sodium hydroxide solution of 60° C. (Example 1A shown later) and 80° C. (Comparison Example 1A shown later) respectively.
Figure 3:

FIG. 2 and FIG. 3 show electron microscopic photographs (×20000) for the particles obtained at temperatures of the aqueous sodium hydroxide solution of 60° C. (Example 1A shown later) and 80° C. (Comparison Example 1A shown later) respectively. Where the temperature for the aqueous sodium hydroxide solution is 60° C., the resulting particles consist only of the acicular particles as shown in FIG. 2 and where the temperature is 80° C. the acicular particles and granular particles are present together as shown in FIG. 3.

Figure 4:
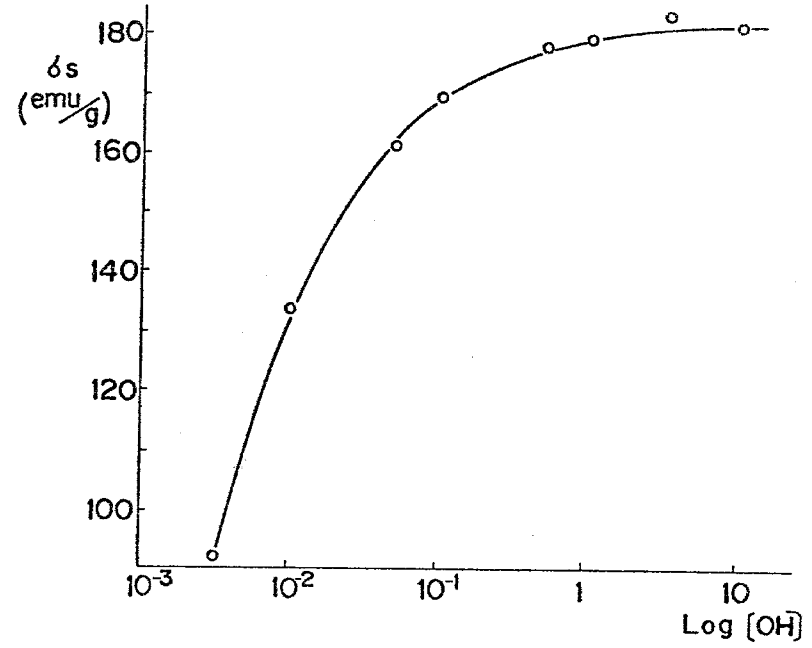
FIG 4 shows a relation between the $OH^-$ concentration of the aqueous sodium hydroxide solution in the control stage for the dissolution amount of $Fe^{2+}$ and the saturated magnetic flux density.

FIG. 4 shows a relation between the $OH^-$ concentration of the aqueous sodium hydroxide solution in the control stage for the dissolution amount of $Fe^{2+}$ and the saturated magnetic flux density, $\sigma_s$.

More specifically, the chart shows the relation between the $OH^-$ concentration for the aqueous sodium hydroxide solution in the control stage for the dissolution of an amount of $Fe^{2+}$ and the saturated magnetic flux density $\sigma_s$ of the particles obtained by the process comprising the steps of suspending the acicular iron particles which have been prepared from the same raw material and under the same heat-reducing conditions as in FIG. 1 into each of two liter aqueous sodium hydroxide solutions of between 0.003 and 10−N at a temperature of 60° C., thereafter, elevating the temperature of the resultant suspension to 70° C. and then passing air therethrough for 60 minutes at a rate of 1.0 l per minute.

As can be seen from FIG. 4, while the fine particles obtained consist only of the acicular particles and show an extremely large saturated magnetic flux density $\sigma_s$ where the $OH^-$ concentration of the aqueous sodium hydroxide solution is above 0.01−N in the control stage for the $Fe^{2+}$ dissolution, inclusion of granular particles other than the acicular particles becomes increased to lower the saturated magnetic flux density $\sigma_s$ as the $OH^-$ concentration goes below 0.01−N. It is considered that the above relation is attributable to that while the acicular ferromagnetic iron particles coated with thin magnetite film are obtained at a concentration above 0.01−N, granular iron oxide particles other than the acicular particles are produced below 0.01−N to increase the solubility of the particles to be treated whereby a lot of $Fe^{2+}$ is dissolved out and the $Fe^{2+}$ component not involved in the formation of the magnetite film forms granular particles by itself.

Figure 5:
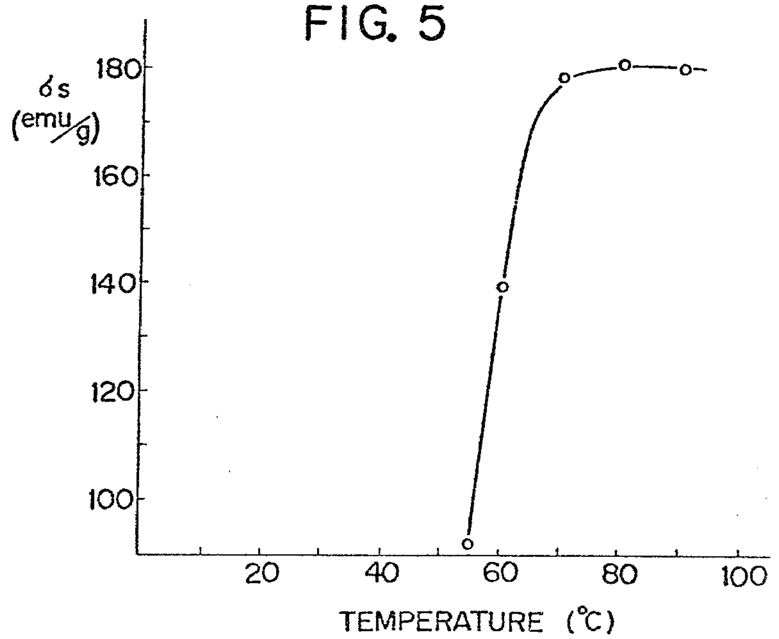
FIG. 5 is a chart showing the relation between the temperature of the aqueous sodium hydroxide solution in the conversion stage into magnetite and the saturated magnetic flux density of the particles obtained.

FIG. 5 is a chart showing the relation between the temperature of the aqueous sodium hydroxide solution in the conversion stage into magnetite and the saturated magnetic flux density $\sigma_s$ of the particles obtained.

More specifically, the chart shows the relation between the saturated magnetic flux density $\sigma_s$ of the fine particles obtained by the process comprising the steps of suspending the acicular ferromagnetic iron particles which have been prepared from the same starting material and under the same heat-reducing conditions as in FIG. 1 in 2 liter of 1.0−N aqueous sodium hydroxide solution at 60° C., thereafter, adjusting the temperature of the above resultant suspension to between 55° to 90°

C. respectively, and then passing air for 60 minutes at a rate of 1.0 l/min., and the temperature of the aqueous sodium hydroxide solution in the conversion step to magnetite.

As can be seen from FIG. 5, while the fine particles obtained consist only of the acicular particles and show an extremely large saturated magnetic flux density $\sigma_s$ where the temperature of the aqueous sodium hydroxide solution is above 60° C. in the conversion step into magnetite, their saturated magnetic flux density $\sigma_s$ rapidly decreases and they tend to discolor and ignite in the subsequent drying stage in the air.

This relation is attributable, it is considered, to that while the acicular ferromagnetic iron fine particles coated with thin magnetite film are obtained at a temperature above 60° C., iron oxides other than magnetite are likely to hinder the satisfactory film formation below 60° C. since a complete formation of the magnetite is difficult at such a temperature.

Reference is to be made for the various specific conditions for carrying out the process of this invention.

(1) The term "acicular iron oxide particles" used herein means acicular $\alpha$-, $\beta$-, $\gamma$-iron (III) oxide hydroxide particles, acicular hematite particles, acicular magnetite particles and acicular maghemite particles, as well as those particles containing metals such as 0.1-10 atomic % of Co and/or Ni based on the amount of total Fe contained therein.

Acicular metallic particles obtained from the above particles through reduction under heating in a reducing gas include acicular ferromagnetic iron particles, acicular ferromagnetic Fe-Co alloy particles and acicular ferromagnetic Fe-Co-Ni alloy particles and they are collectively referred to herein as acicular iron or iron-alloy particles. The magnetite film is naturally in a solid solution form with Co and/or Ni depending upon the types of starting materials and they are collectively referred to herein as a magnetite film.

A very useful process for producing the acicular iron or iron-alloy particles as starting material is disclosed in the applicant's co-pending U.S. Application Ser. No. 783,326 filed on Mar. 31, 1977, now abandoned.

Briefly, the above process comprises the steps of: preparing an aqueous suspension of particles of at least one acicular iron oxide selected from the group consisting of acicular ferric oxide particles and acicular iron (III) oxide hydroxide particles and each of these containing 0.1 to 10 atomic % of Co and/or Ni based on the total amount of Fe while adjusting the pH of the suspension to a value higher than 8; adding 1 to 15 mol % of an amorphous water-soluble silicate calculated as $SiO_2$ based on the total amount of metal into the suspension as fully agitated under non-oxidizing atmosphere and thereby coating homogeneously and densely the acicular iron or iron-alloy oxide particles with the amorphous silicate; converting the resultant amorphous silicate coat on the particles into the crystalline silica coat by water-washing or neutralizing with acid, collecting and drying the particles; and thereafter heating the particles in a stream of reducing gas at a temperature between 400° to 800° C. to thereby obtain acicular magnetic metallic particles. The acicular iron particles prepared by the above process have extremely high $H_c$ and $\sigma_s$ values and they are suited as the starting material for the process of this invention.

(2) The temperature range of the aqueous sodium hydroxide solution in the control stage for the $Fe^{2+}$ dissolution is between 5°-70° C. Above 70° C., granular particles of iron oxides other than the acicular particles result since the solubility of the particles to be treated is increased to dissolve out a larger amount of $Fe^{2+}$ than required.

The temperature ranging from 10° to 60° C. is desired in view of the coating effect of the thin magnetite film.

The $OH^-$ concentration range of the aqueous sodium hydroxide solution in the control stage for the $Fe^{2+}$ dissolution amount is between 0.01-18—N.

Above 18—N, since only an insufficient amount of $Fe^{2+}$ is dissolved out, no satisfactory magnetite film is formed.

On the other hand, below 0.01—N, the solubility of the particles to be treated is increased to dissolve out a larger amount of $Fe^{2+}$ than required thereby causing particles other than the acicular particles to form.

$OH^-$ concentration ranging from 0.1 to 4.0—N is desired from economical and industrial points of view for the washing effect and the like.

Since it is extremely difficult to industrially prepare an aqueous solution of sodium hydroxide at a concentration above 18—N, the upper limit of the $OH^-$ concentration is kept at about 18—N also in this regard.

While various other alkaline substances than sodium hydroxide, for example ammonium hydroxide, can of course be used, the aqueous ammonium hydroxide solution of above 0.01—N can not be prepared at a temperature above 60° C. since the degree of ionization of the aqueous ammonium hydroxide solution into $OH^-$ ions is very low.

This invention can not, therefore, be practiced by the employment of the aqueous solution of ammonium hydroxide.

(3) The temperature range of the aqueous sodium hydroxide solution in the conversion stage into magnetite is between 60°~100° C. Below 60° C., formation of the magnetite is difficult and iron oxides other than the magnetite are likely to form, whereat no sufficient film is formed.

Since the magnetite film is formed in the aqueous medium in this invention, the upper limit of the temperature is 100° C. A temperature ranging from 70° to 90° C. is desired from economical and industrial points of view.

Passing of oxygen-containing gas in the conversion stage into magnetite may be conducted either by quantitatively blowing an oxygen-containing gas or by admixing the air by way of mechanical means such as an agitator or the like.

Where no oxygen-containing gas is supplied in the magnetite conversion stage, the formation of the magnetite is insufficient or no formation reaction occurs thereby causing the products to discolor and ignite in the subsequent drying stage in the air.

(4) Drying temperature in the air is below 100° C. in this invention. Above 100° C., the magnetite film is oxidized into maghemite or hematite to decrease the saturated magnetic flux density in the final products. From 50° to 80° C. of temperature is preferred from economical and industrial points of view.

It will be apparent in carrying out this invention that the acicular iron or iron-alloy particles as starting material obtained through the reduction have to be thrown into the aqueous sodium hydroxide solution without contacting them to the air in this invention. The above purpose can be attained by the methods, for example, by directly pouring an aqueous sodium hydroxide solution into a retort for reducing under heating the above fine magnetic particles, taking out the above fine magnetic particles into a recovery vessel which has been thoroughly replaced with an inert gas and, thereafter, pouring an aqueous sodium hydroxide solution to the vessel or by throwing the fine magnetic particles while keeping them from contacting the air into a bath separately provided for the aqueous sodium hydroxide solution.

The advantageous feature of this invention can be summarized as follows:

Since the acicular iron or iron-alloy particles coated with dense and well-bonding thin magnetite film can be dried at a temperature below 100° C. in the air and, hence, taken out stably even in the air according to this invention, a magnetic recording material of a high output and a high bit density which is most highly demanded at present can be produced in an industrial scale.

Furthermore, since the acicular iron or iron-alloy ferromagnetic fine particles can be dried in the air at a temperature below 100° C. by merely treating them in an aqueous liquid medium with no employment of organic solvents at all and hence can be taken out in the air stably according to this invention, it provides extreme advantages in veiw of the safety of operation and industrial application.

This invention is to be described by way of working examples and comparison examples thereof.

In the experiments, amounts for Co and Ni were measured based on atomic absorption analysis. The amount of $SiO_2$ was measured by $SiO_2$-analysis method of JIS-G 1212.

EXAMPLE 1A

Acicular $\alpha$-FeOOH particles having, in an average value, 1.0$\mu$ of long axis and 20:1 of long axis/short axis ratio were used as starting material and 300 g of such acicular $\alpha$-FeOOH particles were charged in a 7 l capacity retort with one open end and reduced under heating at a reducing temperature of 350° C. for 6 hours in a $H_2$ gas stream passed at a rate of 3 l/min. through the retort being driven rotationally to produce acicular ferromagnetic iron particles.

Then, after replacing the $H_2$ gas with $N_2$ gas and effecting cooling, the above acicular ferromagnetic iron particles were once taken out into a recovery vessel which had been thoroughly replaced with an inert gas and, thereafter, charged and stirred into a 3 l of 1.0-N sodium hydroxide aqueous solution kept at 60° C. in an inert gas ($N_2$) atmosphere over 5 minutes.

Figure 6:
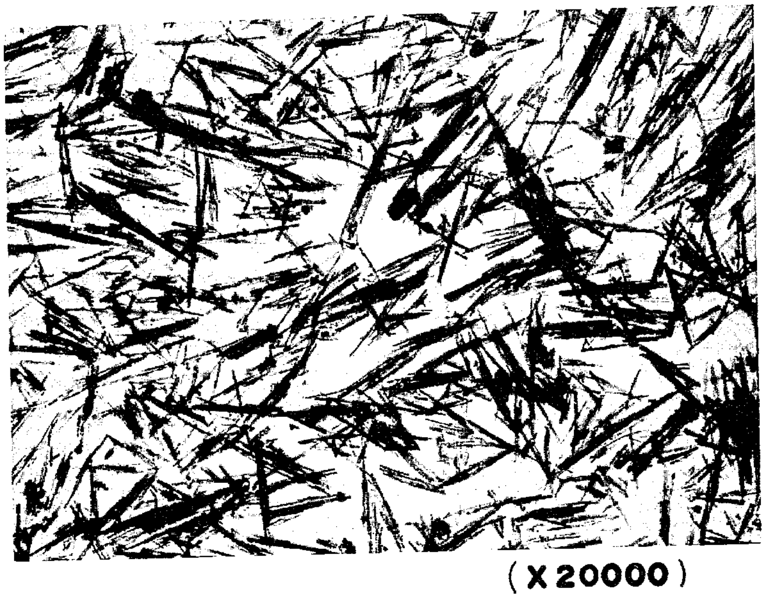
FIGS. 6-7 are electron microscopic photographs (×20000) for the particles obtained in Example 1A and Comparison Example 1A', respectively.

After raising the temperature of the above suspension to 70° C. and blowing the air therein at a rate of 1 l/min. for 60 minutes, the suspension was washed with water, filtered and then dried at 70° C. in a conventional way to obtain acicular ferromagnetic iron particles coated with magnetite. The resultant acicular ferromagnetic iron particles coated with magnetite had, in an average value, 0.7 micron of long axis and 14:1 of long axis/short axis ratio and, as the result of the measurement for the magnetic properties, 179 emu/g of saturated magnetic flux density, $\sigma_s$, and 1030 $O_e$ of coercive force, $H_c$. They were ferromagnetic black particles being capable of treating with stably in the air with no violent oxidation. An electron microscopic photograph of the resultant product is shown in FIG. 6.

Comparison Example 1A'

Figure 7:
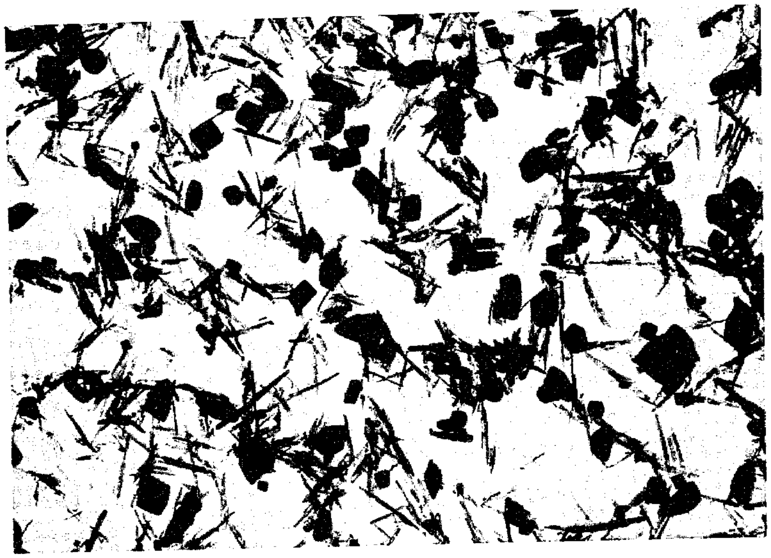

Fine particles were prepared quite in the same manner as in Example 1A with the exceptions of suspending the starting acicular particles into an alkaline solution in air in place of inert gas atmosphere. The resultant product included therein a great amount of granular particles as shown in electron microscope photographic FIG. 7, also attached herewith.

As evidenced above, it is critically important in the invention that the step (a) of the process is carried out under nonoxidative atmosphere therethrough by keeping the solution from contacting the air.

EXAMPLES 2A ~ 19A

Acicular ferromagnetic iron or iron-alloy particles coated with magnetite were prepared quite in the same way as in Example 1A with the exceptions of varying the kind of starting material, $OH^-$ concentration and temperature of the aqueous sodium hydroxide solution in the control stage for $Fe^{2+}$ dissolution amount, temperature at conversion stage to the magnetite and drying temperature. The particles obtained from each of the experiments were ferromagnetic black particles being capable of treating stably in the air with no violent oxidation.

Conditions for preparing the acicular ferromagnetic iron or iron-alloy particles coated with magnetite are shown in Table 1A and the various properties of the above particles thus prepared are shown in Table 2A.

Comparison Example 1A

Fine particles were prepared quite in the same manner as in Example 1A but altering the temperature of the aqueous sodium hydroxide solution to 80° C. in the control stage for the dissolution amount of $Fe^{2+}$ whereat the particles to be coated were charged.

Although the above fine particles could be treated stably in the air, they were found to be ferromagnetic black particles in which the acicular particles and a great amount of granular particles were present together as the result of microscopic observation.

Comparison Example 2A

Fine particles were prepared quite in the same manner as in Example 1A excepting the use of industrial water at pH 8 ($OH^-$ concentration at $10^{-6}$—N) in place of the aqueous sodium hydroxide solution in the control stage for the dissolution amount of $Fe^{2+}$.

Although the above fine particles could be treated stably in the air, they were found to be ferromagnetic black particles in which the acicular particles and a great amount of granular particles were present together as the result of microscopic observation.

Comparison Example 3A

Same treatments as in Example 1A were carried out for 60 minutes with the exception of altering the temperature of the aqueous sodium hydroxide solution to 35° C. in the conversion stage to magnetite.

The fine particles obtained then in the same manner as in Example 1A by way of the same subsequent water washing, filtration and drying in the air at 30° C. were turned to dark black yellow. Based on the measurement for magnetic properties, the particles had 65 emu/g of saturated magnetic flux density, $\sigma_s$.

Comparison Example 4A

The treatments in the conversion stage to magnetite were carried out for 60 minutes quite in the same conditions as in Example 1A but neither with air blowing nor with air inclusion by means of mechanical operation such as an agitator in the aqueous solution. Then, the fine particles obtained by the water washing and filtration as in Example 1A ignited to turn brown red in the air at drying temperature of 50° C.

Comparison Example 5A

Upon treating the particles quite in the same way as in Example 1A in the drying stage excepting that the drying temperature in the air was altered to 120° C., the particles ignited to turn red brown particles during drying. Based on the measurement for the magnetic properties, the particles had 35 emu/g of saturated magnetic flux density.

aqueous solution to the above suspension to previously adjust the pH value to 9.0, 40 g of sodium silicate (sodium silicate #3 on JISK-1408; $SiO_2$, 28.55 wt %) was added and mixed to disperse therein while preventing the inclusion of an oxidizing gas such as air as much as possible. The suspension thus adjusted had a pH value of 10.3 and a viscosity of 2.5 poise. The suspension consisting of sodium silica-coated particles was washed with water, filtered and dried at 110° C. in a conventional way. The acicular α-FeOOH particles thus treated contained 4.50 mol % $SiO_2$ as $SiO_2$/Fe, which corresponded to 97% of $SiO_2$ calculated based on the charged amount of water-soluble sodium silicate.

TABLE 1A

| | Starting material | | | | | Formation of magnetite film | | | |
|---|---|---|---|---|---|---|---|---|---|
| | | Powder property | | | | Control stage for $Fe^{2+}$ dissolution amount | | Conversion stage to magnetite | Drying |
| Example | Type | long axis (μ) | long/short axis/axis | Co content (atomic %) | Ni content (atomic %) | $OH^-$ concentration (N) | temperature (°C.) | temperature (°C.) | temperature (°C.) |
| 1A | α-FeOOH | 1.0 | 20:1 | — | — | 1.0 | 60 | 70 | 70 |
| 2A | " | " | " | — | — | 0.05 | " | " | " |
| 3A | " | " | " | — | — | 0.1 | " | " | " |
| 4A | " | " | " | — | — | 0.5 | " | " | 80 |
| 5A | " | " | " | — | — | 3.5 | " | " | " |
| 6A | " | " | " | — | — | 10.0 | " | " | 50 |
| 7A | " | " | " | — | — | 1.0 | 10 | " | " |
| 8A | " | " | " | — | — | " | 30 | " | " |
| 9A | " | " | " | — | — | " | 50 | " | " |
| 10A | " | " | " | — | — | " | " | 80 | " |
| 11A | " | " | " | — | — | " | " | 90 | " |
| 12A | α-$Fe_2O_3$ | 0.8 | 15:1 | — | — | 1.5 | 30 | 70 | " |
| 13A | γ-$Fe_2O_3$ | 0.6 | 8:1 | — | — | 1.0 | 25 | " | " |
| 14A | α-FeOOH | 0.8 | 25:1 | 3.0 | — | 0.5 | 40 | " | " |
| 15A | " | " | " | " | — | 1.0 | " | " | " |
| 16A | " | " | " | " | — | " | 60 | " | " |
| 17A | " | " | " | " | — | " | " | 90 | " |
| 18A | " | 0.6 | 20:1 | 7.0 | — | " | " | 85 | 70 |
| 19A | " | 1.0 | 25:1 | 3.0 | 0.5 | 2.0 | " | 70 | " |

TABLE 2A

| | Acicular iron or iron-alloy particles | | | |
|---|---|---|---|---|
| | powder property | | magnetic property | |
| | long axis (μ) | long/short axis/axis | coercive force (Hc) (Oe) | saturated magnetic flux density (σs) (emu/g) |
| Example 1A | 0.7 | 14:1 | 1030 | 179 |
| 2A | 0.5 | 10:1 | 1090 | 161 |
| 3A | 0.6 | 12:1 | 1070 | 169 |
| 4A | 0.7 | 14:1 | 1050 | 178 |
| 5A | 0.7 | 14:1 | 1020 | 183 |
| 6A | 0.7 | 14:1 | 1010 | 181 |
| 7A | 0.6 | 12:1 | 1070 | 164 |
| 8A | 0.6 | 12:1 | 1110 | 170 |
| 9A | 0.6 | 11:1 | 1000 | 175 |
| 10A | 0.6 | 12:1 | 970 | 173 |
| 11A | 0.6 | 12:1 | 960 | 177 |
| 12A | 0.6 | 12:1 | 990 | 173 |
| 13A | 0.5 | 10:1 | 910 | 167 |
| 14A | 0.7 | 14:1 | 1170 | 159 |
| 15A | 0.7 | 14:1 | 1130 | 167 |
| 16A | 0.6 | 12:1 | 1090 | 175 |
| 17A | 0.7 | 14:1 | 1010 | 180 |
| 18A | 0.4 | 8:1 | 1180 | 177 |
| 19A | 0.5 | 12:1 | 1080 | 169 |

EXAMPLE 1B 360 g of acicular α-FeOOH particles having, in average value, 0.8~1.0μ of long axis and 15:1 of long axis/short axis ratio was dispersed in water to prepare a 10 l suspension. the resultant suspension had a pH value of 8.2 and a viscosity of 4.8 poise. After adding a NaOH

EXAMPLES 2B~3B

Silica-coated particles were formed quite in the same manner as in Example 1B with the exceptions of varying the type of the starting material, pH value at the addition of the sodium silicate and the addition amount of sodium silicate #3. Conditions for preparing the silica-coated particles and the properties are shown in Table 1B.

EXAMPLE 4B 2880 g of the same acicular α-FeOOH particles having 0.8~1.0μ of long axis and 15:1 of long axis/short axis ratio as in Example 1B was dispersed in water to prepare a 80 l suspension. The resultant suspension had a pH value of 8.2 and a viscosity of 4.8 poise.

After adding a NaOH aqueous solution to the above suspension to previously adjust the pH value to 9.0, 104 g of sodium silicate #3 ($SiO_2$, 28.55 wt %) was added and mixed to disperse therein while preventing the inclusion of an oxidizing gas such as air as much as possible. The suspension thus adjusted had a pH value of 9.6 and a viscosity of 2.8 poise. The suspension consisting of sodium silica-coated particles was poured with 1−N $H_2SO_4$ till the pH value decreased to 4.5 to thereby neutralize the coating sodium silicate. The suspension consisting of the silica-coated particles was washed with water, filtered and then dried at 110° C. in a conventional way. The acicular α-FeOOH particles thus treated had 1.41 mol % of $SiO_2$ as $SiO_2$/Fe, which corresponded to 92% of $SiO_2$ calculated based on the charged amount of water soluble sodium silicate.

EXAMPLES 5B~9B

Silica-coated particles were prepared quite in the same way as in Example 4B with the exceptions of varying the type of starting material, pH value at the addition of sodium silicate, addition amount of sodium silicate #3 and pH value after the neutralization. Conditions for preparing the silica-coated particles and the properties are shown in Table 2B.

EXAMPLE 10B 300 g of the treated fine particles obtained in Example 5B was charged into a 7 l capacity retort with one open end and reduced under heating at a reducing temperature of 500° C. for three hours in a $H_2$ gas stream supplied at a rate of 3 l per minute through the retort being driven rotationally to thereby produce acicular ferromagnetic iron particles. Then, after replacing the $H_2$ gas with $N_2$ gas and cooling, the above acicular ferromagnetic iron particles were once taken out into a recovery vessel which had been thoroughly replaced with an inert gas and, thereafter, charged and stirred in a 3 l of 1.0−N aqueous sodium hydroxide solution kept at 60° C. being kept from contacting with the air over 5 minutes.

After raising the temperature of the above suspension to 70° C. and blowing the air therethrough for 60 minutes at a rate of 1 l/min., the suspension was washed with water, filtered and dried at a temperature of 70° C. in a conventional way to produce acicular ferromagnetic iron particles coated with magnetite film. The acicular ferromagnetic iron particles coated with magnetite film thus obtained had, in average value, 0.70μ of long axis and 12:1 of long axis/short axis ratio and, as the result of magnetic measurement, 165 emu/g of saturated magnetic flux density, $\sigma_s$, and 940 $O_e$ of coercive force, $H_c$. They were black ferromagnetic fine particles being capable of treating stably in the air with no violent oxidation.

EXAMPLES 11B~25B

Acicular ferromagnetic iron particles coated with magnetite film were obtained quite in the same way as in Example 10B with the exceptions of varying the kind of the particles to be treated, reducing temperature, reducing time, $OH^-$ concentration and temperature of the aqueous sodium hydroxide solution in the control stage for $Fe^{2+}$ dissolution amount, temperature in the conversion stage to magnetite and the drying temperature. In each of the experiments, the resulting particles were black ferromagnetic fine particles being capable of treating stably in the air without resulting violent oxidation. Conditions for preparing acicular ferromagnetic iron particle coated with magnetite film and various properties of the particles thus obtained are shown in Table 3B.

Comparison Example 1B

Acicular ferromagnetic iron particles coated with magnetite film were prepared quite in the same way as in Example 10B excepting the use of acicular α-FeOOH fine particles having 0.8~1.0μ of long axis and 15:1 of long axis/short axis ratio but with no silica-coating treatment, in place of the silica-coated acicular α-FeOOH fine particles. The acicular ferromagnetic iron particles coated with magnetite film thus obtained had, in average value, 0.3μ of long axis and 4:1 of long axis/short axis ratio. As the result of the measurement for magnetic properties, their saturated magnetic flux density, $\sigma_s$, was 155 emu/g and the coercive force, $H_c$, was 235 $O_e$.

TABLE 1B

| | Starting material | | | Formation of silica-coated particles | | | | | |
|---|---|---|---|---|---|---|---|---|---|
| | | Powder property | | | | | | Silica-coated particles | |
| Example | Type | Long axis (μ) | Long/Short axis/axis | pH: in suspension | pH: at the addition of sodium silicate | Addition amount of 3# sodium silicate (g) | pH: after the addition of sodium silicate | $SiO_2$/Fe (mol %) | $SiO_2$ coating ratio (%) |
| 1B | α-FeOOH | 0.8~1.0 | 15:1 | 8.2 | 9.0 | 40 | 10.3 | 4.50 | 97 |
| 2B | α-FeOOH | 0.5~0.7 | 15:1 | 4.8 | 8.2 | 85 | 11.2 | 6.78 | 97 |
| 3B | α-$Fe_2O_3$ | 0.65~0.8 | 12.1 | 7.5 | 8.5 | 18 | 9.0 | 1.91 | 94 |

TABLE 2B

| | Starting material | | | Formation of silica-coated particles | | | | | | |
|---|---|---|---|---|---|---|---|---|---|---|
| | | Powder property | | | | | | | Silica-coated particles | |
| Example | Type | Long axis (μ) | Long/Short axis/axis | pH: in suspension | pH: at the addition of sodium silicate | Addition amount of 3# sodium silicate (g) | pH: after the addition of sodium silicate | pH: after neutralization | $SiO_2$/Fe (mol %) | $SiO_2$ coating ratio (%) |
| 4B | α-FeOOH | 0.8~1.0 | 15:1 | 8.2 | 9.0 | 104 | 9.6 | 4.5 | 1.41 | 92 |
| 5B | α-FeOOH | 0.8~1.0 | 15:1 | 8.2 | 9.0 | 320 | 10.3 | 4.3 | 4.45 | 93 |
| 6B | α-FeOOH | 0.8~1.0 | 15:1 | 8.2 | 9.0 | 800 | 11.5 | 4.1 | 10.40 | 90 |
| 7B | α-FeOOH | 0.5~0.7 | 15:1 | 4.8 | 8.2 | 320 | 9.8 | 4.3 | 4.43 | 92 |
| 8B | α-$Fe_2O_3$ | 0.5~0.7 | 12:1 | 7.5 | 8.5 | 320 | 10.6 | 4.2 | 3.97 | 98 |
| 9B | γ-$Fe_2O_3$ | 0.45~0.7 | 8:1 | 7.8 | 8.3 | 320 | 10.0 | 4.0 | 3.85 | 95 |

TABLE 3B

| | | | | Formation of magnetite film | | | | Acicular ferromagnetic iron particles | | | |
|---|---|---|---|---|---|---|---|---|---|---|---|
| | | Reducing stage | | Control stage for $Fe^{2+}$ dissolution amount | | Conversion stage to magnetite | Drying stage | Powder property | | Magnetic property | |
| Example | Type of treated particles (Example No.) | Temperature (°C.) | Time (min.) | $OH^-$ concentration (N) | Temperature (°C.) | Temperature (°C.) | Temperature (°C.) | Long axis (μ) | Long axis/ Short axis | Coercive force:Hc (Oe) | Saturated magnetic flux density: $\sigma_s$ (emu/g) |
| 10B | Example 5B | 500 | 300 | 1.0 | 60 | 70 | 70 | 0.70 | 12:1 | 940 | 165 |
| 11B | " | 600 | 240 | 1.0 | 60 | 70 | 70 | 0.65 | 10:1 | 1050 | 175 |
| 12B | " | 700 | 200 | 1.0 | 60 | 70 | 70 | 0.50 | 8:1 | 1250 | 180 |
| 13B | " | 600 | 240 | 0.1 | 60 | 70 | 50 | 0.65 | 10:1 | 1020 | 170 |
| 14B | " | 600 | 240 | 3.5 | 60 | 70 | 50 | 0.65 | 10:1 | 1100 | 180 |
| 15B | " | 600 | 240 | 10.0 | 60 | 70 | 50 | 0.65 | 10:1 | 1120 | 180 |
| 16B | " | 600 | 240 | 1.0 | 40 | 70 | 80 | 0.65 | 10:1 | 1100 | 163 |
| 17B | " | 600 | 240 | 1.0 | 60 | 80 | 60 | 0.65 | 10:1 | 1120 | 178 |
| 18B | Example 1B | 650 | 300 | 1.5 | 65 | 70 | 70 | 0.70 | 12:1 | 1100 | 175 |
| 19B | Example 2B | 450 | 360 | 1.5 | 65 | 70 | 70 | 0.40 | 10:1 | 950 | 165 |
| 20B | Example 3B | 500 | 240 | 1.5 | 65 | 70 | 70 | 0.50 | 10:1 | 900 | 170 |
| 21B | Example 4B | 550 | 240 | 1.5 | 65 | 70 | 70 | 0.70 | 12:1 | 930 | 175 |
| 22B | Example 6B | 800 | 360 | 1.5 | 65 | 70 | 70 | 0.65 | 10:1 | 1260 | 186 |
| 23B | Example 7B | 550 | 300 | 1.5 | 65 | 70 | 70 | 0.40 | 10:1 | 920 | 168 |
| 24B | Example 8B | 650 | 300 | 1.5 | 65 | 80 | 70 | 0.35 | 8:1 | 1180 | 183 |
| 25B | Example 9B | 650 | 300 | 1.5 | 65 | 90 | 70 | 0.30 | 8:1 | 1150 | 180 |

EXAMPLE 1C 360 g of acicular α-FeOOH particles having, in average value, 1.0∼1.2μ of long axis and 25:1 of long axis/short axis ratio and containing 2.7 atomic % of Co to Fe was dispersed in water to prepare a 10 l suspension. The resultant suspension had a pH value of 8.4 and a viscosity of 4.7 poise.

After adding a NaOH aqueous solution to the above suspension to previously adjust the pH value to 9.2, 40 g of sodium silicate #3 ($SiO_2$, 28.55 wt %) was added and mixed to disperse therein while preventing the inclusion of an oxidizing gas such as air as much as possible. The suspension thus adjusted had a pH value of 10.1 and a viscosity of 2.5 poise. The above suspension consisting of sodium silica-coated particles was washed with water, filtered and then dried at 120° C. in a conventional way. The acicular Co-containing α-FeOOH particles thus treated contained 4.5 mol % $SiO_2$ as $SiO_2$/total metal, which corresponded to 97% of $SiO_2$ calculated based on the charged amount of water soluble sodium silicate.

EXAMPLES 2C∼4C

Silica-coated particles were prepared quite in the same manner as in Example 1C with the exceptions of varying the type of the starting material, pH value at the addition of sodium silicate, and the addition amount of sodium silicate #3. Conditions for preparing the silica-coated particles and the properties are shown in Table 1C.

EXAMPLE 5C 2880 g of the same acicular α-FeOOH particles having, in average value, 1.0∼1.2μ of long axis and 25:1 of long axis/short axis ratio and containing 2.7 atomic % of Co to Fe as in Example 1C was dispersed in water to prepare a 80 l suspension. The resultant suspension had a pH value of 8.4 and a viscosity of 5.0 poise.

After adding a NaOH aqueous solution to the above suspension to previously adjust the pH value to 9.0, 100 g of sodium silicate #3 ($SiO_2$ 28.55 wt %) was added and mixed to disperse therein while preventing the inclusion of an oxidizing gas such as air. The suspension thus adjusted had a pH value of 9.8 and a viscosity of 2.6 poise. 1.0−N $H_2SO_4$ was poured in the suspension consisting of sodium silica-coated particles at a liquid temperature of 50° C. till the pH decreases to 4.5 to neutralize the coating sodium silicate. The suspension consisting of the silica-coated particles was washed with water, filtered and dried at 120° C. in a conventional way. The acicular Co-containing α-FeOOH particles thus treated contained 1.40 mol. % of $SiO_2$ and $SiO_2$/total metal component, which corresponded to 93% of $SiO_2$ calculated based on the charged amount of water soluble sodium silicate. The Co ion concentration in the solution was 1 ppm, which corresponded to about 0.2% dissolution amount of the Co content in the acicular Co-containing α-FeOOH particles as starting material.

EXAMPLES 6C∼13C

Silica-coated particles were prepared quite in the same manner as in Example 5C with the exceptions of varying the type of the starting material, pH value at the addition of sodium silicate, addition amount of sodium silicate #3, temperature at neutralization, and pH value after the neutralization. Conditions for preparing the silica-coated particles and the properties are shown in Table 2C.

EXAMPLE 14C 300 g of the treated fine particles as obtained in Example 6C was charged in a 7 l capacity retort with one open end and reduced under heating at a reducing temperature of 500° C. for 300 minutes in a $H_2$ gas stream passed at a rate of 3 l/min. through the retort being rotationally driven to form acicular iron-alloy particles essentially, consisting of Fe-Co.

Then, after replacing the $H_2$ gas with $N_2$ gas and effecting cooling, the above acicular ferromagnetic iron-alloy particles essentially consisting of Fe-Co were once taken out into a recovery vessel which had been thoroughly replaced with an inert gas and then charged and stirred in 3 l of 1.0-N NaOH aqueous solution kept at 60° C. being kept from contacting with the air for 5 minutes.

After raising the temperature of the above suspension to 70° C., and passing air through for 60 minutes at a rate of 1 l/min., the suspension was washed with water, filtered and then dried at 70° C. in a conventional way to obtain acicular ferromagnetic iron-alloy particles essentially consisting of Fe-Co and coated with magnetite film. The resultant acicular ferromagnetic iron-alloy particles essentially consisting of Fe-Co had, in average value, 0.8μ of long axis and 15:1 of long axis/short axis ratio and, based on the magnetic measurement, 150 emu/g of saturated magnetic flux density, $o_s$, and 1150 $O_e$ of coercive force, $H_c$, and they were ferromagnetic black particles being capable of treating stably in the air with no violent oxidation.

EXAMPLES 15C~33C

The acicular ferromagnetic iron-alloy particles essentially consisting of Fe-Co were prepared just in the same way as in Example 14C with the exceptions of varying the type of the starting material, reducing temperature, reducing time, $OH^-$ concentration and temperature of the aqueous sodium hydroxide solution in the control stage for the dissolution amount of $Fe^{2+}$ and drying temperature. Each of the particles thus prepared was ferromagnetic black particles capable of treating stably in the air with no violent oxidation. Conditions for preparing the acicular ferromagnetic iron-alloy particles essentially consisting of Fe-Co and various properties of the particles thus prepared are shown in Table 3C.

COMPARISON EXAMPLE 1C

Ferromagnetic iron-alloy particles essentially consisting or Fe-Co and coated with magnetite film were prepared quite in the same manner as in Example 14C excepting the use of acicular Co-containing α-FeOOH particles having, in average value, 1.0 ~1.2μ of long axis and 25:1 of long axis/short axis ratio and containing 2.7 atomic % Co to Fe but with no silica coating treatment, in place of the above acicular Co-containing α-FeOOH particles with silica coating treatment. Electron microscopic photographs for the fine particles (×20000 ) showed resultant ferromagnetic iron-alloy particles essentially consisting of Fe-Co and coated with magnetite film which had, in average value, 0.15μ of long axis and 2:1 of long axis/short axis ratio, and based on the magnetic measurement, 150 emu/g of saturated magnetic flux density, $o_s$, and 230 $O_e$ of coercive force, $H_c$.

TABLE 1C

| | Starting material | | | | | Formation of silica-coated particles | | | | | |
|---|---|---|---|---|---|---|---|---|---|---|---|
| | | Powder property | | | | | | | | Silica-coated particles | |
| Example | Type | Long axis (μ) | Long axis/ Short axis | Co content (atomic %) | Ni content (atomic %) | pH: in suspension | pH: at the addition of sodium silicate | Addition amount of 3# sodium silicate (g) | pH: after the addition of sodium silicate | $SiO_2$/total metal (mol %) | $SiO_2$ coating ratio (%) |
| 1C | α-FeOOH | 1.0 ~ 1.2 | 25:1 | 2.7 | — | 8.4 | 9.2 | 40 | 10.1 | 4.50 | 97 |
| 2C | α-FeOOH | 1.0 ~ 1.2 | 25:1 | 2.7 | — | 8.4 | 9.0 | 85 | 10.9 | 6.81 | 96 |
| 3C | α-FeOOH | 0.4 ~ 0.5 | 30:1 | 3.6 | 0.61 | 8.6 | 9.3 | 40 | 10.3 | 4.42 | 94 |
| 4C | α-$Fe_2O_3$ | 0.5 ~ 0.6 | 20:1 | 6.4 | — | 8.0 | 9.0 | 40 | 10.2 | 3.90 | 96 |

TABLE 2C

| | | Starting material | | | | | Formation of silica-coated particles | | | | | | | | |
|---|---|---|---|---|---|---|---|---|---|---|---|---|---|---|---|
| | | | Powder property | | | | | | | | | | Silica-coated particles | | |
| Example | Type | Long axis (μ) | Long Short axis axis | Co content (atomic %) | Ni content (atomic %) | pH: in suspension | pH: at the addition of sodium silicate | Addition amount of 3# sodium silicate (g) | pH: after the addition of sodium silicate | Temperature at neutralization (°C.) | pH: after neutralization | Co/Fe (atomic %) | $SiO_2$/total metal (mol %) | $SiO_2$ coating ratio (%) |
| 5C | α-FeOOH | 1.0 ~ 1.2 | 25:1 | 2.7 | — | 8.4 | 9.0 | 100 | 9.8 | 60 | 4.5 | 2.7 | 1.40 | 93 |
| 6C | α-FeOOH | 1.0 ~ 1.2 | 25:1 | 2.7 | — | 8.4 | 9.0 | 320 | 10.4 | 60 | 4.3 | 2.7 | 4.46 | 94 |
| 7C | α-FeOOH | 1.0 ~ 1.2 | 25:1 | 2.7 | — | 8.4 | 9.0 | 800 | 11.3 | 60 | 4.0 | 2.7 | 10.5 | 92 |
| 8C | α-FeOOH | 0.4 ~ 0.5 | 30:1 | 3.6 | 0.61 | 8.6 | 9.2 | 320 | 10.0 | 55 | 4.2 | 3.6 | 4.45 | 93 |
| 9C | α-FeOOH | 0.5 ~ 0.6 | 20:1 | 6.4 | — | 8.0 | 9.3 | 320 | 10.2 | 55 | 4.2 | 6.4 | 4.40 | 90 |
| 10C | α-FeOOH | 0.5 ~ 0.6 | 20:1 | 7.1 | 0.52 | 8.4 | 9.0 | 320 | 10.1 | 40 | 4.2 | 7.1 | 4.43 | 92 |
| 11C | α-$Fe_2O_3$ | 0.4 ~ 0.5 | 15:1 | 3.2 | — | 8.2 | 9.0 | 200 | 10.0 | 60 | 4.4 | 3.2 | 2.62 | 97 |
| 12C | α-$Fe_2O_3$ | 0.4 ~ 0.5 | 25:1 | 3.6 | 0.61 | 8.4 | 9.4 | 400 | 11.2 | 50 | 4.4 | 3.6 | 5.57 | 98 |
| 13C | α-$Fe_2O_3$ | 0.4 ~ 0.5 | 15:1 | 3.2 | — | 8.2 | 9.0 | 320 | 10.2 | 50 | 4.2 | 3.2 | 3.85 | 95 |

TABLE 3C

| Example | Type of treated particles (Example No.) | Reducing stage: Temp-rature (°C.) | Reducing stage: Time (min.) | Formation of magnetite film: Control stage for $Fe^{2+}$ dissolution amount: $OH^-$ concen-tration (N) | Formation of magnetite film: Control stage for $Fe^{2+}$ dissolution amount: Tempe-rature (°C.) | Formation of magnetite film: Conver-sion stage to magnetite: Tempera-ture (°C.) | Drying stage: Tempe-rature (°C.) | Acicular ferromagnetic iron-alloy particles: Powder property: Long axis (μ) | Acicular ferromagnetic iron-alloy particles: Powder property: Long axis/ Short axis | Acicular ferromagnetic iron-alloy particles: Magnetic property: Coercive force:$H_c$ (Oe) | Acicular ferromagnetic iron-alloy particles: Magnetic property: Saturated magnetic flux density: $\sigma_s$ (emu/g) |
|---|---|---|---|---|---|---|---|---|---|---|---|
| 14C | Example 6C | 500 | 300 | 1.0 | 60 | 70 | 70 | 0.8 | 15:1 | 1150 | 150 |
| 15C | " | 600 | 240 | 1.0 | 60 | 70 | 70 | 0.8 | 15:1 | 1260 | 172 |
| 16C | " | 700 | 200 | 1.0 | 60 | 70 | 70 | 0.7 | 12:1 | 1430 | 181 |
| 17C | " | 600 | 240 | 0.1 | 60 | 70 | 50 | 0.8 | 15:1 | 1220 | 170 |
| 18C | " | 600 | 240 | 3.5 | 60 | 70 | 50 | 0.8 | 15:1 | 1260 | 182 |
| 19C | " | 600 | 240 | 10.0 | 60 | 70 | 50 | 0.8 | 15:1 | 1330 | 186 |
| 20C | " | 600 | 240 | 1.0 | 40 | 70 | 80 | 0.8 | 15:1 | 1250 | 177 |
| 21C | " | 600 | 240 | 1.0 | 60 | 80 | 80 | 0.8 | 15:1 | 1270 | 175 |
| 22C | Example 1C | 650 | 240 | 1.5 | 65 | 70 | 70 | 0.7 | 12:1 | 1380 | 173 |
| 23C | Example 2C | 800 | 360 | 1.5 | 65 | 70 | 70 | 0.7 | 12:1 | 1550 | 170 |
| 24C | Example 3C | 600 | 240 | 1.5 | 65 | 70 | 70 | 0.35 | 12:1 | 1300 | 185 |
| 25C | Example 4C | 600 | 240 | 1.5 | 65 | 70 | 70 | 0.4 | 12:1 | 1300 | 172 |
| 26C | Example 5C | 500 | 300 | 1.0 | 65 | 75 | 70 | 0.8 | 15:1 | 1120 | 153 |
| 27C | Example 7C | 750 | 360 | 1.0 | 65 | 75 | 70 | 0.8 | 15:1 | 1450 | 165 |
| 28C | Example 8C | 650 | 240 | 1.0 | 65 | 75 | 70 | 0.35 | 13:1 | 1430 | 188 |
| 29C | Example 9C | 650 | 240 | 1.0 | 65 | 75 | 70 | 0.4 | 10:1 | 1460 | 175 |
| 30C | Example 10C | 650 | 240 | 2.0 | 60 | 75 | 70 | 0.35 | 10:1 | 1440 | 186 |
| 31C | Example 11C | 550 | 300 | 2.0 | 60 | 75 | 70 | 0.35 | 10:1 | 1200 | 158 |
| 32C | Example 12C | 700 | 240 | 2.0 | 60 | 75 | 70 | 0.35 | 12:1 | 1410 | 180 |
| 33C | Example 13C | 600 | 300 | 2.0 | 60 | 75 | 70 | 0.35 | 10:1 | 1360 | 175 |

What is claimed is:

1. A process for stabilizing acicular ferromagnetic iron or iron-alloy particles which consist of iron or an iron alloy against the oxidation thereof, which comprises (a) suspending acicular ferromagnetic iron or iron-alloy particles which may contain Co or Ni in an aqueous alkaline solution having 0.01 to 18-N hydroxyl ion concentration at a temperature of 5 to 70° C. while stirring the suspension in a non-oxidative atmosphere and thereby controlling the dissolution of ferrous iron from the surface of the acicular particles therein, (b) oxidizing the surface of the acicular particles in the resultant suspension by introducing an oxygen containing gas thereinto at a temperature of 60 to 100° C. to form dense and thin magnetite film on the surface of the acicular particles; and (c) drying the resultant particles of air at a temperature below 100° C.

2. The process of claim 1, in which said acicular ferromagnetic iron or iron-alloy particles used as starting material are suspended in the aqueous alkaline solution at a temperature of 10 to 60° C.

3. The process of claim 1, in which said acicular ferromagnetic iron or iron-alloy particles used as starting material are suspended in an aqueous alkaline solution having 0.1 to 0.4 of hydroxyl ion concentration.

4. The process of claim 1, in which the oxidation of the surface of the acicular particles in the suspension is carried out by introducing the oxygen containing gas thereinto at a temperature of 70 to 90° C.

5. The process of claim 1, in which the drying of the acicular particles obtained from the oxidation step is carried out in the air at a temperature of 50 to 80° C.

6. The process of claim 1, in which said acicular ferromagnetic iron or iron-alloy particles are manufactured by the sequence of:

preparing an aqueous suspension of particles of at least one acicular iron oxide selected from the group consisting of acicular ferric oxide particles and acicular iron (III) oxide hydroxide particles and each of these containing 0.1 to 10 atomic % of Co and/or Ni based on the total amount of Fe while adjusting the pH of the suspension to a value above 8;

adding 1 to 15 mol % of amorphous water-soluble silicate calculated as $SiO_2$ based on the total amount of metal into the suspension fully agitated under non-oxidizing atmosphere and thereby coated homogeneously and densely the acicular iron or iron-alloy oxide particles with the armorphous silicate;

converting the resultant amorphous silicate coat on the particles into a crystalline silica coat by water-washing or by neutralizing the resultant amorphous silicate on the particles by adding an acid to the suspension, collecting and drying the particles; and thereafter heating the particles in a stream of reducing gas at a temperature between 400 to 800° C. to thereby obtain acicular iron or iron-alloy fine particles.

7. The process of claim 6, in which said acicular ferromagnetic iron or iron-alloy particles are suspended in the aqueous alkaline solution at a temperature of 10 to 60° C.

8. The process of claim 7, in which said acicular ferromagnetic iron or iron-alloy particles used as starting material are suspended into an aqueous alkaline solution having 0.4 to 4.0—N of hydroxyl ion concentration.

9. Stabilized acicular ferromagnetic iron or iron-alloy particles obtained by the process of claim 1 having an average particle-size below 1μ.

* * * * *